United States Patent [19]

Riko et al.

[11] 4,015,227
[45] Mar. 29, 1977

[54] ELECTROMAGNETIC TRANSDUCER

[75] Inventors: Yasuhiro Riko; Kenzo Miura, both of Yokohama, Japan

[73] Assignee: Matsushita Electric Industrial Co., Ltd., Osaka, Japan

[22] Filed: Feb. 25, 1975

[21] Appl. No.: 552,887

[30] Foreign Application Priority Data

Feb. 28, 1974 Japan .............................. 49-24012

[52] U.S. Cl. .......................... 335/231; 179/115 R; 179/115.5 ES
[51] Int. Cl.² ........................................ H01F 7/08
[58] Field of Search ... 179/115 R, 115 A, 115.5 ES; 335/231

[56] References Cited
UNITED STATES PATENTS

| 2,116,293 | 5/1938 | Weitkowitz | 335/231 |
| 2,566,850 | 9/1951 | Mott | 335/231 |
| 3,060,282 | 10/1962 | Duncan | 179/115 R |
| 3,112,374 | 11/1963 | Gorike | 179/115 R |

FOREIGN PATENTS OR APPLICATIONS 300,837  11/1928  United Kingdom ........... 179/115 R

*Primary Examiner*—George Harris
*Attorney, Agent, or Firm*—Stevens, Davis, Miller & Mosher

[57] ABSTRACT

An electromagnetic transducer in which a D.C. magnetic flux generating section including a permanent magnet and a signal flux generating section including a coil are arranged in spaced relation on opposite sides of a diaphragm to form a balanced type transducer.

7 Claims, 21 Drawing Figures

ELECTROMAGNETIC TRANSDUCER

The present invention relates to an electromagnetic transducer in which a D.C. magnetic circuit including a permanent magnet and an A.C. magnetic circuit receiving an electric signal are arranged in spaced relation on opposite sides of a diaphragm.

Referring to FIG. 1 which illustrates a general structure of a prior art electromagnetic transducer, it comprises a permanent magnet 1, a magnetic circuit yoke 2, a diaphragm 4 of magnetic material and an exciting coil 3 arranged inside the magnetic circuit yoke 2 to surround the permanent magnet 1.

A D.C. flux $\phi_o$ by the permanent magnet 1 and A.C. flux $\phi_1$ by a signal current through the exciting coil 3 passes a magnetic path of the permanent magnet 1 → diaphragm 4 → magnetic circuit yoke 2.

A factor which determines an output sensitivity of an electromagnetic transducer, i.e. a force factor A is expressed by;

$$A = N \frac{\partial \phi_o}{\partial \xi}$$

where
N: number of turns of a coil
$\phi_o$: D.C. flux
$\xi$: displacement of the diaphragm Therefore, when such an electromagnetic transducer is used as an electro-mechanical transducer, for example, an output drive force P is expressed by $$P = NI \cdot \frac{\phi_o}{RS}$$
$$= \frac{\phi_o \cdot \phi_1}{4\pi S}$$

where
I: supply signal current
$\phi_1$: A.C. magnetic flux
R: total reluctance of the magnetic circuit
S: cross sectional area of magnetic pole It is therefore apparent that the sensitivity of the electromagnetic transducer depends on the magnitude of the product $\phi_o \cdot \phi_1$. From the above it is seen that in the prior art magnetic circuit as shown in FIG. 1, the D.C. magnetic flux may be of sufficient magnitude but the A.C. magnet flux $\phi_1$ is of very small magnitude even when NI is rendered large because an extremely large reluctance such as that of the permanent magnet is included. Accordingly, the sensitivity is not sufficient and the transducer is not appropriate to the applications requiring a high sensitivity such as an earphone for a hearing-aid for the deaf.

Furthermore, when the D.C. magnetic flux $\phi_o$ and the A.C. magnetic flux $\phi_1$ are passed to a common magnetic circuit, it is desirable for the diaphragm 4 and the pole surfaces 1—1 of the magnet to be disposed as closed as possible to each other for conducting the flux $\phi_1$ but, on the other hand, the diaphragm may be attracted to the pole surfaces 1—1 upon sudden increase of the flux $\phi_o$ to disable the operation. It is therefore difficult to establish an optimum operating point. Namely, it is impossible to simultaneously meet both the optimum requirements for the D.C. magnetic circuit and the optimum requirements for the A.C. magnetic circuit and hence one of the requirements must be sacrificed. This results in the transducer of a low sensitivity.

It is an object of the present invention to provide a novel structure for a magnetic circuit which facilitates the design and the manufacture of such a magnetic circuit without sacrificing the optimum requirements of the magnetic circuit.

According to one aspect of the present invention, a periphery of the magnetic circuit of the electromagnetic circuit of the present invention is made of non-magnetic material so that a D.C. magnetic flux of a large magnitude is prevented from passing the diaphragm horizontally and magnetic saturation in the diaphragm is prevented. Also by adjusting the diaphragm and the thickness thereof an accoustic vibrating system which is independent of the magnetic circuit can be designed.

According to a second aspect of the present invention, the diaphragm is positioned intermediate to the magnetic gap to reduce distortion due to the vibration and allow a wide dynamic range.

According to a third aspect of the present invention, a flexible member is provided at a peripheral portion and a central portion is formed of magnetic, rigid material so that the effective area of the diaphragm may be expanded with the result that the displacement of the diaphragm may be reduced and the movement thereof may be rendered uniform to reduce the distortion.

According to a fourth aspect of the present invention, the permanent magnet and the coil are enclosed by the magnetic circuit and further covered by an outer casing of magnetic material so that a magnetic flux generated in the electromagnetic transducer may be confined therein to prevent the influence by the leakage flux.

The above and other objects, features and the advantages of the present invention will become more apparent from the following detailed description of the preferred embodiments of the present invention when taken in conjunction with the accompanying drawings, in which.

Figure 2:
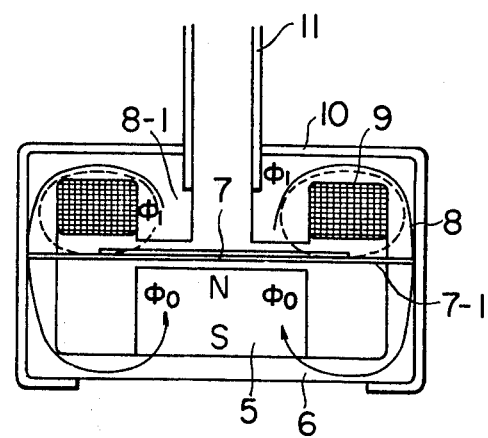
FIG. 2 is a sectional view of one embodiment of an electromagnetic transducer in accordance with the present invention.
Figure 3:
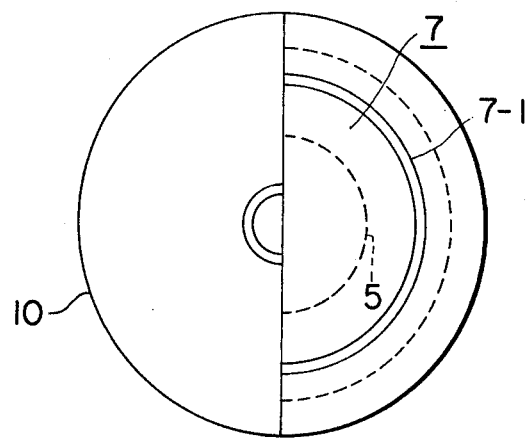
FIG. 3 shows a plane external view, partly in horizontal section, of the electromagnetic transducer of FIG. 2.

Referring first to FIG. 2 which shows an embodiment of the electromagnetic transducer in accordance with the present invention, an upper magnetic circuit and a lower magnetic circuit are separated by a diaphragm 7 and arranged on opposite sides thereof. A permanent magnet 5 is disposed at the center of a lower magnetic circuit yoke 6 which surrounds the permanent magnet 5, and affixed thereto by bonding or other means.

Fitted between the lower magnetic circuit yoke 6 and an upper magnetic circuit yoke 8 is the diaphragm 7 partially made of magnetic material. Provided at the center of the upper magnetic circuit yoke 8 and slightly spaced from the diaphragm 7 is an upper magnetic pole 8-1 adapted to face the permanent magnet 5.

Fixedly fitted between the upper magnetic pole 8-1 and a periphery of the upper magnetic circuit yoke 8 is a coil 9. A sound outlet 11 for guiding sound to and from the exterior is provided on the upper magnetic pole 8-1.

With this arrangement, the D.C. magnetic flux $\phi_o$ passes, as shown by a solid line in FIG. 2, from the permanent magnet 5 through a gap between the poles, the upper magnetic circuit yoke 8, the lower magnetic circuit yoke 6 and back to the permanent magnet 5. On the other hand, the A.C. magnetic flux $\phi_1$ passes, as shown by a dotted line in FIG. 2, transversely to the coil 9 through the upper magnetic circuit yoke 8 and the diaphragm 7.

The magnetic circuit of the present embodiment is constructed such that the D.C. magnetic flux $\phi_o$ and the A.C. magnetic flux $\phi_1$ merge together at the upper yoke 8 and the magnetic gap above the diaphragm.

Figure 4:
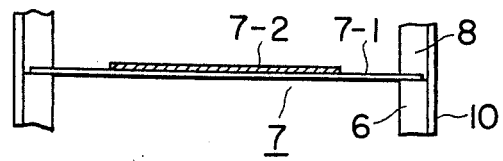
FIG. 4 is an enlarged view of a structure of another diaphragm which may be incorporated in the electromagnetic transducer in accordance with the present invention.

Referring to FIG. 4, the diaphragm 7 consists of a flexible, non-magnetic material 7-1 and a relatively rigid, magnetic material 7-2 which are united into a single plate by bonding.

Figure 5:
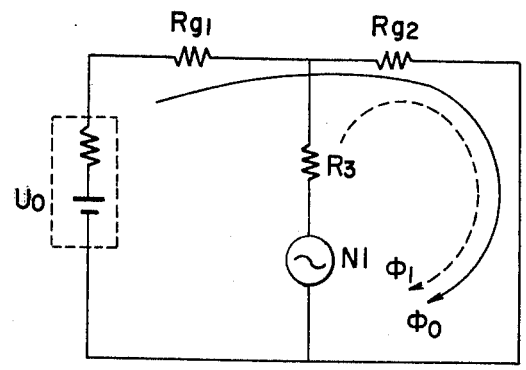
FIG. 5 shows schematically a magnetic equivalent circuit of the embodiment shown in FIG. 2.

FIG. 5 shows a magnetic equivalent circuit of the embodiment shown in FIG. 2. The symbols at the upper and lower yoke and for leakage reluctances represent the following.

$U_o$: magneto-motive force of the permanent magnet
N: number of turns of the coil
$R_{g1}$: reluctance at a gap between the diaphragm and the permanent magnet
$R_{g2}$: reluctance at a gap between the diaphragm and the upper magnetic pole
$R_3$: reluctance at a gap between the diaphragm and the upper yoke
I: current flowing through the coil The D.C. magnetic flux $\phi_o$ and the A.C. magnetic flux $\phi_1$ pass along the paths shown by the solid line and the dotted line, respectively in FIG. 2. As a result, both fluxes superimpose upon each other developing a drive force there.

Figure 1:
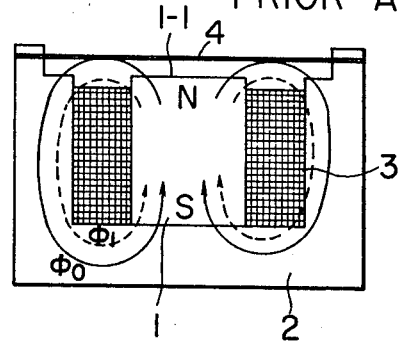
FIG. 1 illustrates a general structure of a prior art electromagnetic transducer.

A first feature in the magnetic circuit of the above arrangement is that because of the nonmagnetic peripheral portion as shown in FIG. 4 a D.C. magnetic flux of a large magnitude does not pass horizontally along the diaphragm unlike that in the prior art transducer as shown in FIG. 1 so that the magnetic saturation in the diaphragm does not occur.

Accordingly, by the appropriate selection of the diaphragm and the thickness thereof, the design of the electromagnetic transducer as an acoustic vibration system independently of the design of the magnetic circuit may be facilitated.

A second feature is that the diagphram is disposed intermediate to the magnetic gap to provide a so-called magnetically balanced type structure so that distortion due to vibration is reduced and a wider dynamic range is allowed.

A third feature is that as shown in FIG. 4 the peripheral portion of the diaphragm 7 is provided with the flexible member 7-1 and the center portion thereof is formed of the magnetic, rigid member 7-2 so that the effective area of the diaphragm may be expanded and the displacement of the diaphragm required to develop a given sound pressure at an exit of the sound outlet 11 may be reduced, with the result that the movement of the diaphragm in the interpole gap can be rendered uniform and limited to a smaller amplitude, which is turn results in the decrease of sub-resonance and the reduction of distortion.

A fourth feature is a relatively simple manner of construction in which the permanent magnet 5 and the coil 9 are assembled in the upper and lower magnetic circuits respectively and then these subassemblies are disposed on both sides of the diaphragm 7 in facing relation and finally the assembly is affixed by the outer casing 10 of magnetic material. It can, therefore, be manufactured in a production line on a mass production basis.

A fifth feature is that the permanent magnet 5 and the coil 9 are completely enclosed by the upper and lower magnetic circuits and further covered by the outer casing 10 of magnetic material so that the fluxes $\phi_o$ and $\phi_1$ developed in the transducer are confined therein without leaking to the outside thereof with the result that the influence by the leakage flux, particularly on other transducers positioned close thereto can be completely ignored.

This feature also assures that the degree of the influence on the transducer by another magnetic environment is extremely small and the external magnetic flux can be fully intercepted.

Figure 6:
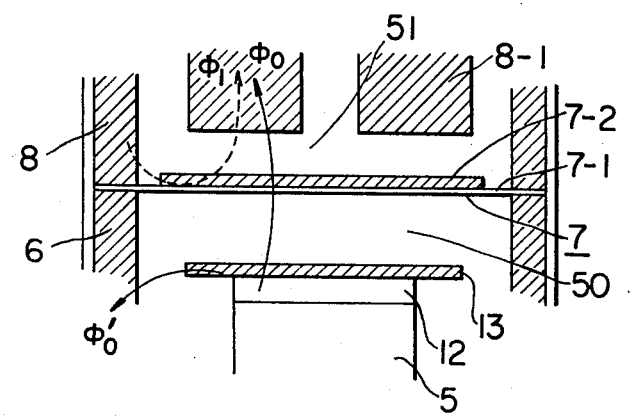
FIG. 6 is an enlarged sectional view of another embodiment of the electromagnetic transducer in accordance with the present invention.

FIG. 6 shows another embodiment of the present invention in which, disposed on a permanent magnet corresponding to the permanent magnet 5 shown in FIG. 2 is a pole piece 12, on which a magnetic pole plate 13 is provided. In this structure, the D.C. magnetic flux $\phi_o$ generated from the permanent magnet 5 primarily passes a diaphragm 7-1, a rigid member 7-2 which corresponds to the armature, in a vertical direction, the upper magnetic circuit yoke 8 from the center thereof to the periphery thereof, and through the lower magnetic circuit yoke 6 back to other pole of the permanent magnetic 5.

A part of the D.C. magnetic flux $\phi_o'$ passes along the planes of the pole piece 12 and the magnetic pole plate 13, through the lower magnetic circuit yoke 6 to the other pole of the permanent magnet 5.

Figure 7:
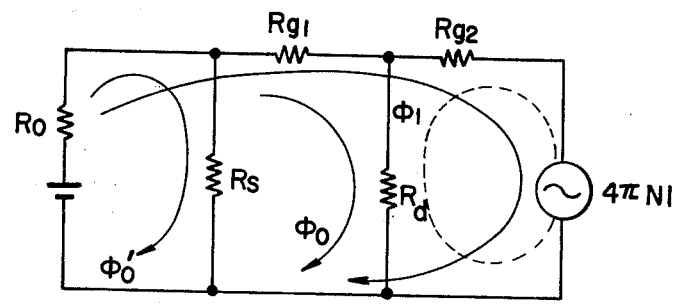
FIG. 7 shows schematically a magnetic equivalent circuit of the embodiment shown in FIG. 6.

FIG. 7 shows a magnetic equivalent circuit of the structure shown in FIG. 6, wherein $R_o$ represents an internal reluctance of the permanent magnet 5, $R_s$ a reluctance for the leakage of the magnetic pole plate 13, $R_{g1}$ a reluctance at the gap 50, $R_d$ a reluctance of the armature 7-2 in the direction of the magnetic circuit yokes 8 and 6, and $R_{g2}$ a reluctance at the gap 51. It is seen from FIG. 7 that in order to make the magnitude of the fluxes $\phi_o$ and $\phi_1$ at the gap 51 as large as possible it is desirable to maintain the relation $R_{g2} < R_d < R_{g1}$ in the magnitudes of these reluctance and at the same time makes these magnitudes as small as possible.

In the structure shown in FIG. 6, the dimension of the gap 51 is selected to be sufficiently small in order to attain a large magnitude of $\phi_1$. The attraction force for the armature 7-2 toward the magnetic pole of the upper magnetic yoke caused by the reduction of the gap dimension can be balanced out by the attraction force on the opposite side of the armature 7-2 caused by the similar reduction of the dimension of the gap 50.

While the D.C. magnetic flux $\phi_o$ passing through $R_d$ increases, which in turn tends to magnetically saturate the armature 7-2 to suppress the increase of the A.C. flux $\phi_1$, the magnetic saturation of the armature 7-2 may be prevented by changing the dimension of the magnetic pole plate 13 and adjusting $R_s$.

Namely, by appropriately selecting the dimension of the magnetic pole plate 13 it is possible to reduce the dimension of both gaps while keeping the balance of the attractive forces acting on the armature 7-2 so that the armature is not saturated and the fluxes $\phi_o$ and $\phi_1$ may be increased.

A first feature of the electromagnetic transducer according to the present embodiment is that by the proper selection of the dimension of the magnetic pole plate 13 the interpole gap can be reduced while keeping the balance of the attractive forces acting on the armature 7-2 and while preventing the armature 7-2 from nbeing saturated, whereby fluxes $\phi_1$ and $\phi_o$ of large magnitude can be selected, allowing a transducer of high sensitivity.

A second feature is that because of a so-called balanced type structure in which uniform attractive forces act on both sides of the armature, the structure may be operated at lower stability compared with an unbalanced type structure so that a higher sensitivity may be set. At the same time the distortion due to the vibration is reduced and a wider dynamic range is allowed.

A third feture is that because of the arrangement of the magnetic pole plate 13 close to the armature 7-2 the D.C. flux is prevented from passing through the armature 7-2 in an excess amount to avoid the magnetic saturation, allowing better conduction of the flux $\phi_1$ and the maintenance of higher sensitivity.

This may also be attained by using a thicker armature 7-2 but in this case the frequency band available is narrowed because the mass of the vibration system is increased. In the transducer of the present embodiment the mass of the vibration system is kept small and a wider frequency is available.

Figure 8:
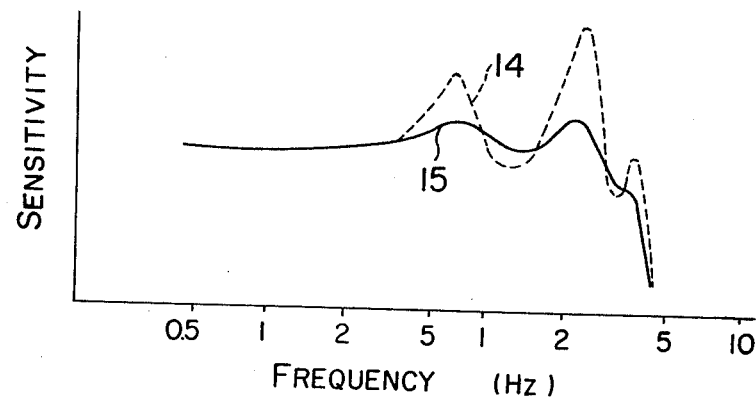
FIG. 8 shows a frequency characteristic of the electromagnetic transducer when applied to an earphone.

A fourth feature is that because of the arrangement of the magnetic pole plate 13 close to the diaphragm 7 a control function due to the laminar flow viscosity of air in the gap 50 is attained. FIG. 8 shows the comparison of the operations of an earphone when an appropriate magnetic pole plate is provided (15) and when such plate is eliminated (14).

A fifth feature is a simple structure which facilitates the assembly and at the same time presents an advantage of the balanced type structure, while requiring one permanent magnet and one set of major parts as are necessary in the unbalanced type. This feature is particularly advantageous from the viewpoint of cost.

Figure 9:
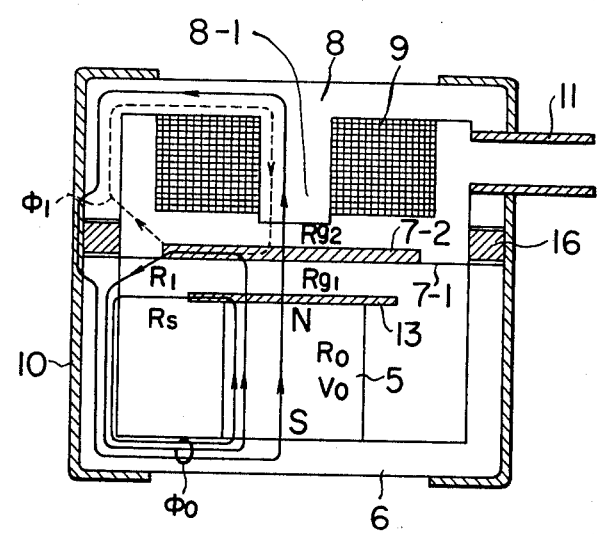
FIG. 9 is a sectional view illustrating a structure of an electromagnetic transducer in accordance with another embodiment of the present invention.

FIG. 9 shows another embodiment in which a diaphragm fixing ring 16 of non-magnetic material is provided between the yokes 6 and 8. In this embodiment, the D.C. magnetic flux $\phi_o$ by the permanent magnet 5 passes from the magnetic pole plate 13 vertically through the armature 7-2 to a magnetic pole 8-1 of the upper magnetic yoke 8, thence through the periphery of the upper magnetic yoke 8 and a portion of the casing 10 to the lower magnetic yoke 6 and back to the permanent magnet 5. A part of the D.C. magnetic flux passes a direct shortcircuited path from the magnetic pole plate 13 to the lower magnetic yoke 6 in a horizontal direction.

On the other hand, the A.C. magnetic flux $\phi_1$ developed when a signal current is supplied externally to the coil 9 is similar to that developed in FIG. 2 and hence it is not explained here.

Figure 10:
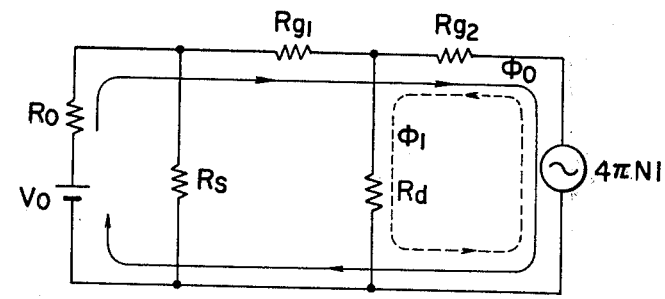
FIG. 10 shows a magnetic equivalent circuit of the electromagnetic transducer shown in FIG. 9.

FIG. 10 shows a magnetic equivalent circuit of the structure shown in FIG. 9, in which the paths for the D.C. magnetic flux $\phi_o$ and the A.C. magnetic flux $\phi_1$ are shown.

In FIG. 10, $R_o$ represents an internal reluctance of the permanent magnet 5, $V_o$ a magneto-motive force of the permanent magnet, $R_s$ a leakage reluctance between the magnetic pole plate 13 and the lower magnetic yoke 6, $R_{g1}$ a reluctance between the magnetic pole plate 13 and the armature 7-2, $R_{g2}$ a reluctance between the armature 7-2 and the upper magnetic pole 8-1, $R_d$ a leakage reluctance between the armature 7-2 and the lower magnetic yoke 6.

As seen from FIG. 10 it is at the area of $R_{g2}$ that the fluxes $\phi_o$ and $\phi_1$ superimpose on each other and hence it is important in order to enhance the sensitivity of the electromagnetic transducer of the present structure to render as high fluxes $\phi_o$ and $\phi_1$ as possible to pass through that area.

The requirement for rendering the magnitude of $\phi_o$ passing through $R_{g2}$ large is;

$$R_d > R_{g2} \tag{1}$$

and $R_s$ is preferably as large as possible provided that it does not cause the magnetic saturation of the armature 7-2.

On the other hand, in order to make the flux $\phi_1$ passing through $R_{g2}$ large and prevent the flux $\phi_1$ from passing through $R_{g1}$, it is necessary that;

$$R_{g1} > R_d \tag{2}$$

Therefore, from the formulas (1) and (2) the following relation is required;

$$R_{g1} > R_d > R_{g2} \tag{3}$$

It is thus sufficient to determine the dimensional relationship of the respective parts to satisfy the above relation.

From the above formula (3) it is seen that $R_{g2}$ is preferably as small as possible. In actual fact, however, it depends on the attractive force for the diaphragm and the manufacturing tolerance in the manufacture of the electromagnetic transducer.

Figure 11:
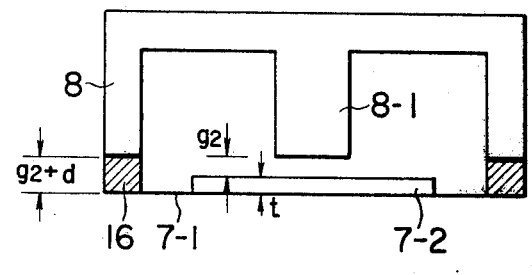
FIG. 11 shows the details of a diaphragm section including an upper magnetic yoke and an armature.

The $R_{g2}$ and hence the magnitude of the gap g2 between the armature 7-2 and the upper magnetic pole 8-1 directly influence the sensitivity and the damping characteristic of the vibration system, and the nonuniformity of the magnitude of the $R_{g2}$ leads to nonuniformity in the sensitivity and the frequency characteristic. In the structure of FIG. 9, the detail of which is shown in FIG. 11, since the plane periphery of the upper magnetic yoke 8 finished to be coplanar with the plane of the upper magnetic pole 8-1 by polishing or other means, and a diaphragm fixing ring 16 of a given thickness and the armature 7-2 are provided, the gap g2 can be presented with an extremely high stability.

On the other hand, from the formula (3) it is desirable that $R_{g1}$ is as large as possible but it should not be made larger than necessary because the D.C. magnetic flux $\phi_o$ is supplied to $R_{g2}$ through $R_{g1}$.

Between the requirements for $R_{g2}$ and $R_{g1}$, $R_d$ should be adjusted such that a maximum product of $\phi_1$ and $\phi_o$ is attained. To accomplish this, the dimension of the armature 7-2 may be adjusted, but this also changes the stiffness S of the diaphragm 7-1 and the effective area $S_o$ of the diaphragm. Thus it poses a very difficult problem in making the optimum design for the vibration system and the optimum design for the magnetic circuit compatible.

In the structure shown in FIG. 9, however, by using non-magnetic material as the diaphragm fixing ring 16 it is possible to restrict $R_d$ below an appropriate magnitude for satisfying the formula (3). Even when $R_d$ is restructed below the appropriate magnitude, the D.C. magnetic flux $\phi_o$ passing through $R_{g2}$ is not at all reduced because the exterior of the diaphragm fixing ring 16 is covered by the casing 10 of magnetic material.

Figure 12:
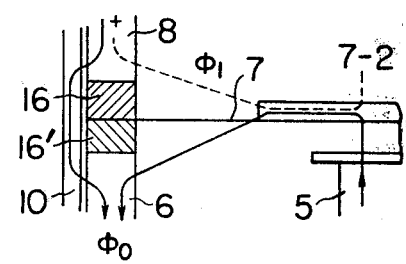
FIG. 12 is an enlarged fragmental view illustrating a modification of a diaphragm support section.

Another approach to restrict Rd below an appropriate magnitude and support the diaphragm 7-1 is illustrated in an embodiment shown in FIG. 12 wherein in addition to the non-magnetic ring 16 a separate non-magnetic ring 16' is provided, with the diaphragm 7 being fitted between the rings 16 and 16' and fixed to the upper and lower magnetic yokes 6 and 8. The advantage derived from the structure is the same as that in the previous embodiment. These approaches allow the optimum design for the vibration system, including the armature 7-2, completely independently from the optimum design for the magnetic circuit. They are, therefore, advantageous in designing the transducer and at the same time allow the best performance of the electromagnetic transducer.

Figure 13:
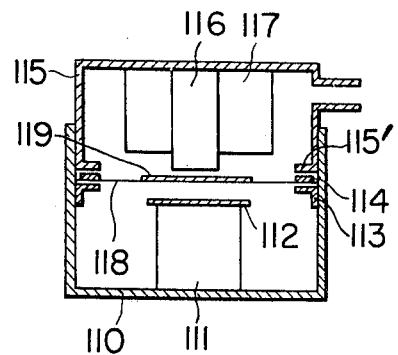
FIG. 13 is a sectional view illustrating a structure in which a basic structure of the present invention is incorporated.
Figure 14:
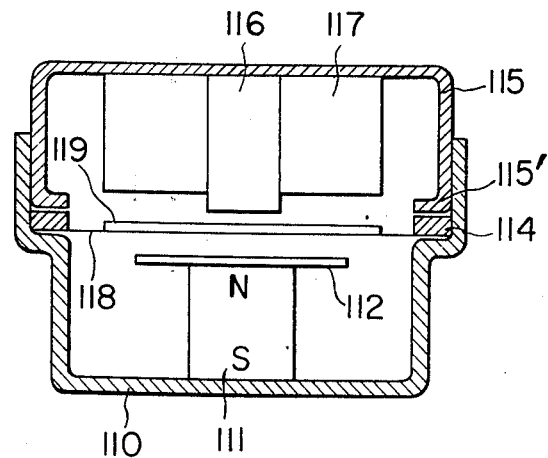
FIG. 14 is a sectional view illustrating another structure in which the basic structure of the present invention is incorporated.

FIGS. 13 and 14 show examples of the application of the basic structure of the present invention described above to practical electromagnetic transducers. In the structure of these examples the magnetic yokes have been manufactured by pressing or a like process.

In FIG. 13, an upper magnetic yoke 115 is provided with an inward bend 115' as a support for a diaphragm 118 and the plane thereof is finished to be coplanar with the plane of an upper magnetic pole 116.

Inside a lower magnetic yoke 110 there is fixed an insulating material 113 for supporting the diaphragm 118 by bonding or welding, and supported between the insulating material 113 and the bend 115' is a diaphragm fixing ring 114.

The thickness of the diaphragm fixing ring 114 and the armature 119 are selected such that a required gap is assured between the upper magnetic pole 116 and the armature 119.

The upper magnetic pole 116 is fixed inside the upper magnetic yoke 115 by bonding, welding or the like and a coil 117 is fixedly inserted in the upper magnetic pole 116. A permanent magnet 111 is fixed to the lower magnetic yoke 110 and a magnetic pole plate 112 is fixed to the permanent magnet 111, respectively by bonding or the like.

The structure of FIG. 14 is similar to that of FIG. 13 and the advantage derived from this structure is also similar to that of FIG. 13 and hence it is not described here. In this structure, however, instead of using the insulating material in FIG. 13 the lower magnetic yoke 110 is formed with a step, between which and the bend 115' of the upper magnetic yoke 115 the diaphragm fixing ring 114 is supported.

A first feature of the electromagnetic transducer of this structure is that a so-called magnetic balanced type structure is provided with one set of a permanent magnet, a coil and other major parts so that it prevents an unbalanced attractive force from acting continuously on the diaphragm, which otherwise results in creeping which, in turn, leads to the distortion of the diaphragm and the deterioration in time of the sensitivity and the characteristics. In addition, since the stability may be lowered a high sensitivity is allowed and the distortion is reduced resulting in an extremely high performance. Further the requirement of only one set of major parts renders the structure extremely attractive from the viewpoint of manufacturing cost.

A second feature is that the sensitivity and the frequency characteristic can be optimized since the requirement of the formula (3) necessary for the magnetic circuit and the optimum requirement for the vibration system can be independently met. This feature is particularly effective when the structure is applied to an earphone for a hearing-aid in which small size and high sensitivity are required.

A third feature is that it possesses many advantages of the magnetic balanced type structure yet it requires only one set of major parts, as shown in FIGS. 13 and 14 rendering the structure simpler and the assembly easier. In addition since the gap between the upper mangetic pole and the armature, which most often influence the sensitivity and the frequency characteristic, may be always set to a fixed value by the thicknesses of the diaphragm fixing ring and the armature thus, a stabilized quality in the manufacture is assured.

A fourth feature is that the gap between the upper magnetic pole and the armature is narrow and set with a high precision, and by virtue of the laminar flow viscosity of air in the gap the damping at a resonant point of the vibration system can be well controlled to provide a flat frequency characteristic.

Figure 15:
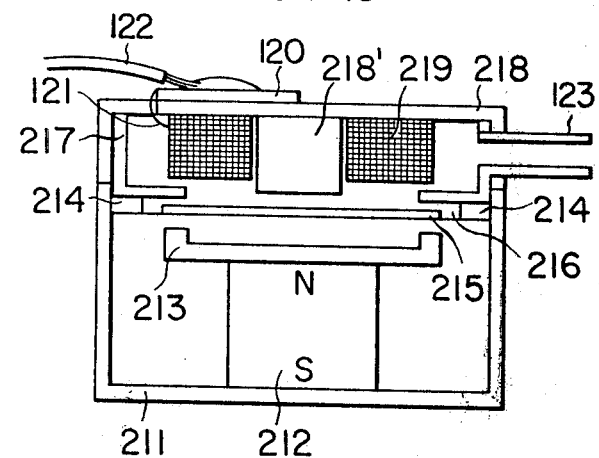
FIG. 15 shows an overall structure of another embodiment in accordance with the present invention.

FIG. 15 shows another embodiment in accordance with the present invention in which the reference numeral 211 designates a lower magnetic yoke having a permanent magnet 212 fixedly mounted at the center therein and allowing the passage of the D.C. magnetic flux along an external surface thereof, and 213 designates a lower magnetic pole fixed above the permanent magnet 212 and formed in a concave shape to collect the D.C. magnetic flux generated from the permanent magnet 212 primarily at a periphery thereof. 214 designates a disphragm ring of non-magnetic material which pulls the diaphragm 216 under tension.

Fixedly bonded on the top surface of the diaphragm 216 is an armature 215 of magnetic material. 217 designates an upper peripheral magnetic pole which allows the flux to pass through the armature 215. 218 designates an upper magnetic yoke which allows the passage of the A.C. signal magnetic flux generated by a coil 219. 218 designates an upper magnetic pole projecting at the center of the upper magnetic yoke 218, the coil 219 being fixed to surround the upper magnetic pole 218. 121 designates a lead port for taking a lead of the coil 219 out of the upper magnetic yoke 218, and 122 designates a lead taken through a relaying terminal 120. 123 designates a sound pipe for picking up sound pressure generated by vertical vibration of the diaphragm 116.

The principle of operation of the present embodiment will now be described taking as an example an electro-mechanical transducer application.

Figure 16:
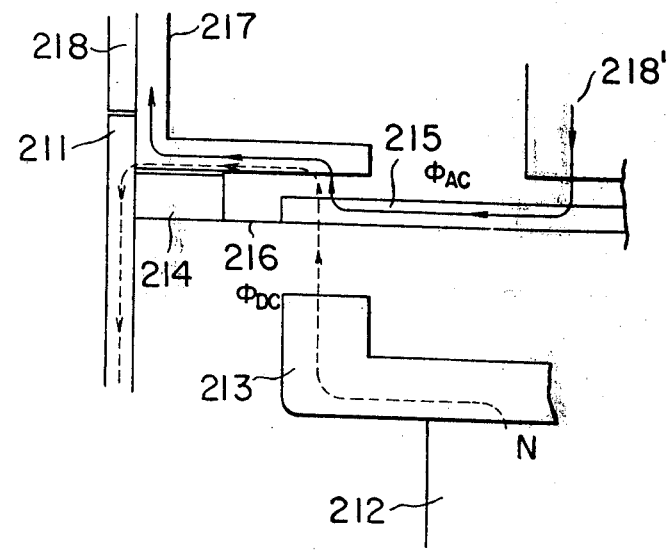
FIG. 16 is an enlarged view of a principal portion of the structure shown in FIG. 15.

FIG. 16 shows an enlarged view of major portions related to the generation of the magnetic drive force, in the overall structure shown in FIG. 15.

Referring to FIG. 16, the D.C. magnetic flux $\phi_{DC}$ generated by the permanent magnet 212 passes from the peripheral projecting portion of the lower magnetic pole 213 fixed at the top of the permanent magnet 212 vertically through the armature 215, through the upper peripheral magnetic pole 217 to a side wall of the lower magnetic yoke 211, thence along the side wall to the other magnetic pole of the permanent magnetic 212.

When a signal current is passed through the terminal lead 121 of the coil 219 disposed in the upper magnetic yoke 218, a signal magnetic flux $\phi_{AC}$ is generated in the area of the upper center magnetic pole 218. At a certain instant the signal magnetic flux $\phi_{AC}$ passes from the upper center magnetic pole 218 through the inside of the armature 215 horizontally to the upper peripheral magnetic pole 217, thence along the side wall of the upper magnetic yoke 218 and upwardly back to the upper center magnetic pole 218.

In the electromagnetic transducer it is at the area of the superimposition of the steadily passing D.C. magnetic flux $\phi_{DC}$ and the signal magnetic flux $\phi_{AC}$ generated by the signal current that the driving force proportional to the signal current is generated.

In the magnetic circuit of the present embodiment, the fluxes $\phi_{DC}$ and $\phi_{AC}$ superimpose on each other at the gap between the armature 215 and the upper peripheral magnetic pole 217 to generate the driving force between the armature 215 and the upper peripheral magnetic pole 217. The driving force which is proportional to the signal current acts on the peripheral portion of the armature 215, and since the armature 215 can be regarded as a rigid boy it vibrates vertically like a piston in response to the driving force generated.

Figure 17:
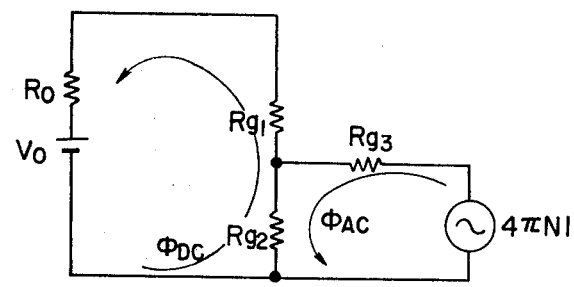
FIG. 17 shows a magnetic equivalents circuit of the electromagnetic transducer shown in FIG. 15.

FIG. 17 shows a magnetic equivalent circuit of the electromagnetic transducer in accordance with the present invention shown in FIG. 15.

Referring to FIG. 17, $V_o$ designates a magneto-motive force of the permanent magnet 212, $R_o$ an internal reluctance of the permanent magnet 212, $R_{g1}$ a reluctance at the gap between the lower magnetic pole 213 and the armature 215, $R_{g2}$ a reluctance at the gap between the armature 215 and the upper peripheral magnetic pole 217, $R_{g3}$ a reluctance at the gap between the upper center magnetic pole 218 and the armature 215, and $4\pi NI$ designates a magneto-motive force for the signal flux generated by the coil 219 when the signal current I is passed through the coil 219 having the number of turns of N.

The paths along which the fluxes $\phi_{AC}$ and $\phi_{DC}$ pass are shown in FIG. 17. The fluxes $\phi_{AC}$ and $\phi_{DC}$ superimpose on each other at the area of $R_{g2}$, i.e. at the gap between the armature 215 and the upper peripheral magnetic pole 217. At this area the signal driving force is generated, the magnitude of which is represented by $$F = \frac{\phi_{DC} \cdot \phi_{AC}}{4\pi S}$$

where
$\phi_{AC}$: signal flux
$\phi_{DC}$: D.C. flux
S: facing magnetic pole area It is therefore desirable that the fluxes $\phi_{AC}$ and $\phi_{DC}$ passing through the facing magnetic area are as large as possible.

In the present embodiment, as shown in FIG. 17, it is so constructed that the A.C. magnetic flux $\phi_{AC}$ and the D.C. magnetic flux $\phi_{DC}$ are both concentrated on the facing magnetic pole portions effective to generate the driving force, i.e. the gap between the armature 215 and the upper peripheral magnetic pole 217 and the gap between the armature 215 and the lower magnetic pole 213.

Thus, the fluxes $\phi_{AC}$ and $\phi_{DC}$ do not leak to pass the effective interpole gap, and sufficient gap is provided at the periphery so that the fluxes do not scatter to the periphery. Further, the diaphragm 216 and the diaphragm ring 214 are made of non-magnetic material in order to prevent leakage from the armature 215 directly to the side wall of the lower magnetic yoke 211.

With this arrangement most of the fluxes $\phi_{DC}$ and $\phi_{AC}$ are allowed to pass through the path shown in FIG. 16 for effective use in generating the driving force.

In the structure shown in FIG. 15, a main path for the D.C. flux $\phi_{DC}$ is as shown by the dotted line in FIG. 16, and the armature 215 is arranged at the gap between the lower magnetic pole 213 and the upper peripheral magnetic pole 217 to transverse the flux. By appropriately positioning the armature 215 it is possible to fix the armature 215 at a balanced position at which the armature 215 is not biased either upwardly or downwardly. Thus, at this position a balanced force acts on the armature 215 so that the operation of a so-called balanced type electromagnetic transducer is attained.

Figure 18:
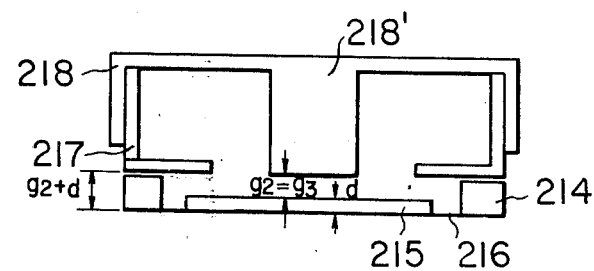
FIG. 18 illustrates the assembly and the dimensional relationship of FIG. 15

Regarding the assembly, the upper peripheral magnetic pole 217 is inserted to be fitted into the inside of the upper magnetic yoke 218. As shown in FIG. 18, the bottom of the upper peripheral magnetic pole 217 fixedly fitted to the upper magnetic yoke 218 and the end surface of the upper center magnetic pole 218 are finished to be coplanar with each other by lapping or the like.

The diaphragm ring 214 having the height of $g2 + d$ is bonded to said plane, and bonded to the bottom surface thereof is the diaphragm 216 having the armature 215 of the thickness d bonded thereto; thereby the gap between the upper peripheral magnetic pole 217 and the armature 215 and the gap between the upper center magnetic pole 218' and the armature 215 are both maintained at g2 (= g3).

Thus, in obtaining a required magnetic gap it may be readily adjusted by the thickness of the diaphragm ring 214, and a uniform gap length g2 (= g3) can be always assured by the use of the diaphragm ring 214 and the armature 215 of constant dimensions. This feature is particularly advantageous in supplying relatively uniform and stable products while mass-producing the electromagnetic transducers.

A first feature of the electromagnetic transducer constructed in accordance with the present embodiment is that because of a so-called balance type electromagnetic transducer in which the D.C. magnetic flux vertically passes through the armature, it is possible to lower the stability for the attraction of the diaphragm to the magnetic pole and hence it is possible to set a high sensitivity. Also, because of the balanced type structure, no biased force is applied to the diaphragm so that the distortion of the diaphragm resulting from long term application of biased force and distortion by creeping can be avoided, which allows a stabilized characteristic over an extended period.

A second feature is that by the use of nonmagnetic material for the diaphragm and the diaphragm ring for reducing the flux leakage, the flux can be concentrated to the area effective for the generation of the driving force so that a high sensitivity is allowed. In addition, since the structure is such that the D.C. flux does not pass along the armature, the armature itself is not magnetically saturated so that the A.C. magnetic flux $\phi_{AC}$ passing through the inside of the armature is not lost, allowing a high sensitivity.

A third feature is that since the facing magnetic poles associated with the generation of the driving force are arranged at the periphery of the armature the driving force primarily acts on the periphery of the armature. Since the armature can be regarded as a rigid body, the diaphragm including the armature makes an ideal vertical piston movement to present less distortion and a better characteristic.

A fourth feature is the operation of the balanced type structure while requiring only one set of coils, magnets and other major parts unlike the prior art balanced type structure where two sets of such major parts were required. This feature is particularly advantageous from the viewpoint of the cost in massproducing the electromagnetic transducer of the present embodiment.

A fifth feature is that as shown in FIG. 15 by finishing the plane of the upper peripheral magnetic pole fitted into the upper magnetic yoke and the plane of the upper center magnetic pole to be flush with each other and by using the diaphragm ring and an armature of constant thickness, the gap between the armature and the upper peripheral magnetic pole, the dimension of which influences most the sensitivity, can be easily prepared with high precision.

This feature allows production of relatively uniform products in mass-producing the electromagnetic transducers of the present embodiment, and is particularly adavantageous in miniaturizing the products because they can be assembled with high precision and relation simplicity.

Figure 19:
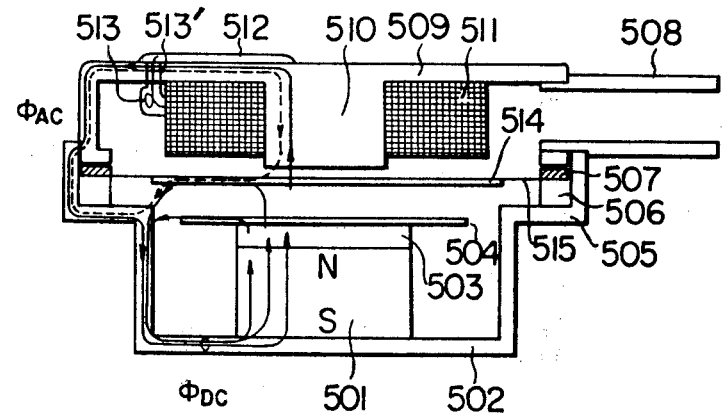
FIGS. 19 and 20 show overall structures of further embodiments of the present invention.
Figure 20:
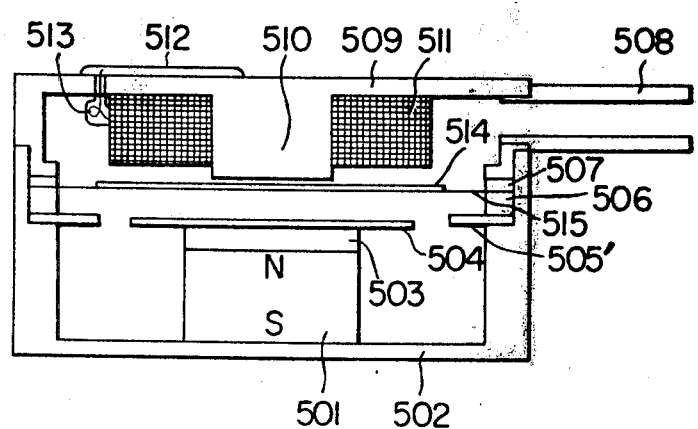
Figure 21:
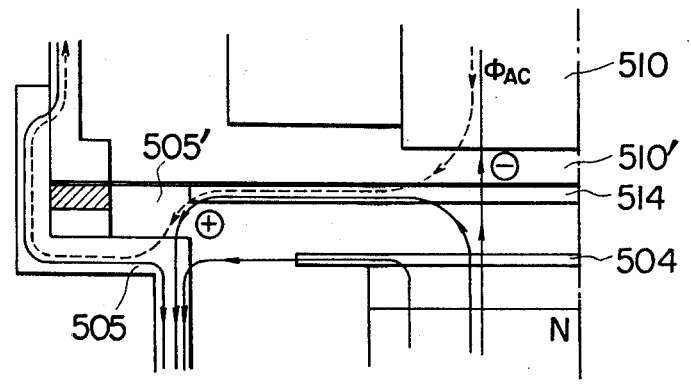
FIG. 21 is an enlarged view of a part of the structure shown in FIG. 19.

FIGS. 19 to 21 show the embodiments in which the paths for the D.C. flux and the A.C. flux are improved. Referring to FIG. 19, a permanent magnet 501 is fixed at the center of the inside of an lower magnetic yoke 502 which serves to pass the D.C. flux to an external periphery. Fixed at the top of the permanent magnet 501 is a pole piece 503 on which a magnetic pole plate 504 is fixedly mounted. The lower magnetic yoke 502 is formed with a step 505 at an external periphery thereof, on which a ring spacer 506 of non-magnetic material is fitted.

An armature 514 of disc shape made of magnetic material is fixedly bonded at the center of a diaphragm 515 of non-magnetic material and also supported under tension by a diaphragm ring 507 of non-magentic material. An upper magnetic yoke 509 is provided with a convex magentic pole 510 at the center thereof and a coil 511 is fitted to a periphery of the magnetic pole 510 and fixed thereto by bonding or the like. A lead 513 of the coil 511 is connected to a terminal board 512 through a terminal bore 513'.

Inserted in a portion of the periphery of the upper magnetic yoke 509 and caulked or bonded thereto is a second pipe 508.

The principle of operation of the present embodiment will now be explained taking as an example an electro-mechanical transducer application.

In FIG. 19, when a signal current is supplied externally to the terminal 512, the signal magnetic flux $\phi_{AC}$ whic is proportional to the magnitude of the signal current is generated in the magnetic pole 510. As shown by a dotted line in FIG. 19 the magnetic flux $\phi_{AC}$ passes through the gap between, the magnetic pole 510 and the armature 514, the inside of the armature 514 to the step 505 of the lower magentic yoke, thence through the periphery of the lower magnetic yoke 502 back to the top of the upper magnetic yoke 509.

On the other hand, a portion of the D.C. flux $\phi_{DC}$ generated from the permanent magnet 501 passes vertically through the armature 514, thence through the upper magnetic pole 510, the periphery of the upper magentic yoke and the periphery of the lower magnetic yoke back to the other pole of the permanent magnet 501. Another portion of the D.C. flux $\phi_{DC}$ passes from the permanent magnet 501 to the armature 514, thence passes horizontally through the inside of the armature 514, through the step 505 and the periphery of the lower magnetic yoke back to the other pole of the permanent magnet 501.

A further portion of the D.C. magnetic flux $\phi_{DC}$ passes from the permanent magnet 501 through the magnetic pole plate 504 horizontally and through the periphery of the lower magnetic yoke back to the other pole of the permanent magnet 501.

At the areas where the signal flux $\phi_{AC}$ and the D.C. flux $\phi_{D.C.}$ superimposed on each other, vibrating drive forces which are proportional to the signal current act. Thus, the FIG. 19, the drive forces proportional to the signal are generated at the gap between the upper magnetic pole 510 and the armature 514 and at the gap between the armature 514 and the step 505 of the lower magnetic yoke.

FIG. 21 is an enlarged view illustrating the areas at which the fluxes $\phi_{AC}$ and $\phi_{DC}$ superimpose on each other. In FIG. 21, the drive force generated at the gap between the armature 514 and the upper magnetic pole 510 is opposite in phase to the drive force generated at the gap between the armature 514 and the step 505. Since both drive forces act on opposite sides of the armature 514 they act in additive manner to drive the diaphragm. This means that the diaphragm is operated in push-pull mode between the magnetic poles so that a large resultant drive force is produced and at the same time higher order distortions may be reduced.

In this manner, the diaphragm 515 including the armature 514 is activated by the drive forces proportional to the signal current applied to the terminal 512, at the center of the top of the armature 514 and at the center of the bottom of the armature 514 in additive mode.

Through the vertical reciprocal movement of the diaphragm 515, pressure change occurs in an air chamber above the diaphragm 515. A sound pipe 508 for guiding externally such pressure change as sound pressure is provided at a portion of the periphery of the upper magnetic yoke.

With the structure of the present embodiment shown in FIGS. 19 and 21, because of the step 505 the internal air chamber volume of the lower magnetic yoke 502 is reduced at the periphery with the result that the acoustic stiffness presented by the air chamber becomes larger, which in turn impedes the vertical recoprocal movement of the diaphragm 515.

FIG. 20 shows another embodiment for implementing the concept of the present invention.

In FIG. 20, instead of the step 505 in FIG. 19, a corresponding shelf board 505' of ring shape made of magnetic material is provided. The function of the shelf board 505' is exactly the same as that of the step 505 shown in FIG. 19 an hence it is not described here. With this arrangement since the air chamber volume in the magnetic yoke can be made larger it is possible to reduce the acoustic stiffness presented by the air chamber so that the movement of the diaphragm is less impeded, which in turn allows high sensitivity of the acoustic transducer.

While the embodiment was explained for the example of the electro-mechanical transducer, it should be understood that the application to an acoustic electrical transducer may be attained in the same manner.

A first feature of the present embodiment is that since the diaphragm is driven from both the upper magnetic yoke and the projecting portion of the periphery of the lower magnetic yoke, in opposite phases, high sensitivity of the transducer is attained. It is balanced for the D.C. magnetic flux and operates in double-side drive mode for the signal drive force, with the result that a high sensitivity is attained and even order harmonic vibrations can be attenuated. With the structure shown in FIG. 20, the internal volume of the lower magnetic yoke can be made larger so that the back volume stiffness which impedes the movement of the diaphragm can be reduced.

A second features is that only one set of a coil and permanent magnet, which are major parts in constructing the electromagnetic transducer, is required. This feature enables reduction of the material cost as well as the number of assembly steps and serves to reduce the cost of the products.

While the present invention has been described and shown in connection with the preferred embodiments thereof, it is apparent that the electromagnetic transducer in accordance with the present invention is characterized by the balanced type has high sensitivity in the operational aspects of the transducer. It is also has a reduced number of parts and it is easy to manufacture the assembly with high precision, which facilitates mass-production, in its structural aspect.

What is claimed is

1. An electromagnetic transducer, comprising:
 a. a diaphragm
 b. a first yoke, of U-shaped section and magnetic material, having one end connected to the periphery of said diaphragm, said first yoke including an armature at a center part thereof and a first singkle magnetic flux generating means including a permanent magnet having one end adjacent said armature and providing a D.C. magnetic flux; and
 c. a second yoke of magnetic material having a sound outlet and one end connected to the periphery of said diaphragm, said second yoke including a projection at a center part thereof adjacent said armature and a second single magnetic flux generating means including a coil generating an A.C. magnetic flux, said first generating means and said second generating means being spaced apart on opposite sides of said diaphragm to form a balanced transducer.

2. An electromagnetic transducer according to claim 1, further comprising a magnetic pole plate at the side of said diaphragm of the permanent magnet, having a length which is shorter than the diameter of said armature and longer than the diameter of said permanent magnet, and wherein a part of the D.C. magnetic flux passes directly through said first yoke.

3. An electromagnetic transducer according to claim 1, wherein said second yoke and said projection are separately formed.

4. An electromagnetic transducer according to claim 2, wherein said diaphragm is fixed on a ring of non-magnetic material, and the ends of said first yoke and said second yoke are in contact with the lower and upper parts of said ring respectively.

5. An electromagnetic transducer according to claim 1, wherein said first yoke and said second yoke are magnetically connected.

6. An electromagnetic transducer according to claim 2, further including a projection on said permanent magnet to concentrate D.C. magnetic flux at the peripheral part of said armature.

7. An electromagnetic transducer according to claim 4, further including a peripheral magnetic pole at said second yoke so that magnetic flux passes through said armature.

* * * * *